(12) United States Patent
Humble et al.

(10) Patent No.: US 6,974,300 B1
(45) Date of Patent: Dec. 13, 2005

(54) STICKER HANDLING MEANS FOR LUMBER STACKING

(76) Inventors: Erik L. Humble, Box 53, Otis Orchards, WA (US) 99027; Charles W. Moles, 24902 E. Roxanne, Newman Lake, WA (US) 99205

( * ) Notice: Subject to any disclaimer, the term of this patent is extended or adjusted under 35 U.S.C. 154(b) by 75 days.

(21) Appl. No.: 10/676,245

(22) Filed: Sep. 30, 2003

Related U.S. Application Data

(63) Continuation-in-part of application No. 10/087,129, filed on Feb. 27, 2002, now Pat. No. 6,644,911.

(51) Int. Cl.[7] ............................................. B65G 57/03
(52) U.S. Cl. .............................. 414/794.3; 414/789.5; 414/794.4
(58) Field of Search ..................... 414/789.5, 794.3, 414/794.4

(56) References Cited

U.S. PATENT DOCUMENTS

| | | | | |
|---|---|---|---|---|
| 3,703,965 | A * | 11/1972 | Coats .................... | 414/788.4 |
| 3,737,053 | A * | 6/1973 | Lunden ................... | 414/791.8 |
| 3,738,510 | A * | 6/1973 | Mason .................... | 414/789.5 |
| 3,904,044 | A * | 9/1975 | Lunden ................... | 414/789.5 |
| 3,908,834 | A * | 9/1975 | Lunden ................... | 414/794.1 |
| 3,968,886 | A * | 7/1976 | Leon ..................... | 414/789.5 |
| 4,057,150 | A * | 11/1977 | Lunden .................. | 414/794.1 |
| 4,144,976 | A * | 3/1979 | Rysti .................... | 414/789.5 |
| 4,253,787 | A * | 3/1981 | Lunden et al. ........... | 414/789.5 |
| 4,324,521 | A * | 4/1982 | Lunden et al. ........... | 414/789.5 |
| 4,330,055 | A * | 5/1982 | Lunden .................. | 198/463.5 |
| 5,263,812 | A * | 11/1993 | Bowlin ................... | 414/789.5 |
| 5,350,272 | A * | 9/1994 | Bowlin ................... | 414/789.5 |
| 5,636,965 | A * | 6/1997 | Newnes et al. ........... | 414/789.5 |
| 5,720,592 | A * | 2/1998 | Gillingham et al. ...... | 414/789.5 |
| 5,921,740 | A * | 7/1999 | Stewart ................. | 414/399 |
| 5,993,145 | A * | 11/1999 | Lunden .................. | 414/789.5 |
| 6,007,295 | A * | 12/1999 | Sears et al. ............ | 414/789.5 |
| 6,048,164 | A * | 4/2000 | Ritola ................... | 414/789.5 |
| 6,238,174 | B1 * | 5/2001 | Faerber .................. | 414/789.5 |
| 6,644,911 | B2 * | 11/2003 | Humble et al. .......... | 414/789.5 |
| 6,722,844 | B2 * | 4/2004 | Lunden .................. | 414/789.5 |
| 6,755,605 | B2 * | 6/2004 | Halper ................... | 414/789.5 |

* cited by examiner

*Primary Examiner*—Douglas Hess
(74) *Attorney, Agent, or Firm*—John S. Reid

(57) ABSTRACT

Sticker handling apparatus include an actuating assembly that operatively supports one or more sticker support brackets. The actuating assembly includes a first actuator and a second actuator. The first actuator is configured to impart motion to the sticker support bracket in a first dimension and the second actuator is configured to impart motion to the sticker support bracket in a second dimension different from the first dimension. The actuating assembly can thus be selectively actuated to move the one or more sticker support brackets in a manner such that one or more stickers are contacted and lifted by respective sticker support brackets and moved from a sticker in-feed conveyor to respective sticker trays supported on respective fork arms with no substantial rotation of the one or more sticker support brackets.

20 Claims, 7 Drawing Sheets

STICKER HANDLING MEANS FOR LUMBER STACKING

CROSS REFERENCE TO RELATED APPLICATIONS

This application is a continuation-in-part of U.S. patent application Ser. No. 10/087,129 filed Feb. 27, 2002, now U.S. Pat. No. 6,644,911, which is hereby incorporated by reference herein in its entirety.

BACKGROUND

The practice of placing milled lumber pieces, or boards, into orderly stacks of predetermined sizes has long been known to facilitate storage, transportation, and handling of the lumber. Further, the stacking of lumber pieces in certain manners is known to enhance various lumber processing operations such as lumber drying and curing and the like. Specifically, the stacking of lumber pieces, wherein the pieces are spaced apart from one another within the stack to allow for air circulation between the lumber pieces, is known to promote efficiency of lumber drying operations, and especially of operations wherein drying kilns are employed.

In relatively recent times, automatic lumber stacking apparatus have been developed to increase production capacity and efficiency, as well as to avoid the tedium and safety risk associated with the manual stacking of lumber pieces. The general nature of a typical prior art lumber stacking apparatus can be easily understood by an examination of U.S. Pat. No. 4,057,150 to Lunden. As a study of the '150 patent reveals, the operation of a typical prior art automatic lumber stacking apparatus can be generally described as in the following paragraphs in conjunction with the FIG. 1 of the subject patent.

Referring to FIG. 1 of the '150 patent, the lumber pieces 12 to be stacked are brought into the lumber stacking apparatus 10 on a lumber in-feed conveyance means 25. The lumber in-feed conveyance means 25 can have any of a number of acceptable and known forms, including a drag-chain conveyor, for example. The lumber pieces 12 are staged and accumulated in a single-layer course at a pickup station 15 to await transfer from the pickup station 15 to a stacking station 18 where a lumber stack 16 is formed.

A fork assembly 51 lifts the accumulated course of lumber pieces 12 from the lumber conveyance means 25 at the pickup station 15 and moves the course of lumber pieces to a stacking station 18, where the course is deposited on a hoist platform 17. The course of lumber pieces 12 is typically removed from the fork assembly 51 by way of a stationery rake-off device (not shown) which is synchronously deployed relative to the movement of the fork assembly, the result of which is to strip the course off of the fork assembly as the fork assembly moves away from the stacking station 18 and back toward the pickup station 15. The prior art rake-off device will be described in further detail in later discussion.

The above-described process of moving the lumber pieces 12 from the pickup station 15 to the stacking station 18, wherein successive courses of lumber pieces 12 are placed one upon the other by the fork assembly 51, is repeated as often as necessary to form a lumber stack 16 of desired size on the hoist platform 17. The hoist platform 17 is generally configured to move the stack 16 incrementally downward in synchronous correspondence with placement of each successive lumber course thereupon so as to maintain the top surface of the stack at a substantially constant elevation relative to the path of the fork assembly 51. Upon formation of a lumber stack, the completed stack is removed from the hoist platform 17, and formation of a new stack is commenced thereupon.

As mentioned briefly above, it can be desirable to cause successive courses within a given lumber stack to be spaced apart from one another in order to promote drying processes and the like. Such spacing of successive courses of lumber within a given lumber stack is typically accomplished by placing spacers between the lumber courses that are to be spaced apart. The spacers are often in the form of relatively small lumber strips that are referred to in the art as "stickers." While the placement of stickers during the formation of a lumber stack can be accomplished manually, it is obviously desirable to perform sticker placement automatically in conjunction with the operation of an automatic lumber stacking apparatus.

Accordingly, some prior art lumber stacking apparatus incorporate automatic sticker placers that operate in conjunction therewith to automatically form a lumber stack having spaced apart courses. Prior art sticker placers of a variety of configurations have been developed. The U.S. Pat. No. 4,253,787 to Lunden discloses at least two types of sticker placers. One type of prior art sticker placer can be understood by an examination of FIGS. 6, 7, 8, and 9 of the '787 patent. With reference thereto, a sticker in-feed conveyance means 73 is employed which can be in the form of an endless lug chain conveyor as depicted. Such a lug chain conveyor typically comprises a plurality of lugs which are spaced at predetermined intervals, the purpose of which is to facilitate control of the location of the stickers 15 on the sticker in-feed conveyance means 73.

Stickers 15 are moved from a sticker hopper (not referenced) or the like and into the pickup area (not referenced) and underneath the fork assembly 24 by way of the sticker in-feed conveyance means 73. The path of movement of the stickers 15 on the sticker in-feed conveyance means 73 is generally transverse with respect to the operational path of movement of the fork assembly 24 as well as to the movement of the lumber pieces 12 on the lumber in-feed conveyance means 18. The fork assembly 24 includes a plurality of individual fork arms 25. Each of the fork arms 25 has at least one sticker tray 84 attached thereto on which a sticker is to be placed.

A sticker transfer means 80 is employed to transfer stickers from the sticker in-feed conveyance means 73 to the sticker trays 84, wherein one sticker is placed in each of the sticker trays. The sticker transfer means 80 includes a number of frame members 87, 88 that are connected to one another in a rigid manner. The sticker transfer means 80 also includes several pairs of flat support brackets 86 that are rigidly connected to the frame members 87, and are configured to contact a corresponding sticker 15 and lift the sticker off of the sticker in-feed conveyance means 73 in response to movement of the frame members 87, 88 in an upward direction relative to the sticker in-feed conveyance means.

After the stickers 15 are lifted off of the sticker in-feed conveyance means 73 by the sticker support brackets 86, the stickers are held in a stationary position until the upward movement of the fork assembly 24 causes the corresponding sticker tray 84 to contact the respective sticker and to lift the sticker from the support brackets. After lifting the sticker 15 from the sticker transfer means 80, the fork assembly 24 then moves upwardly to contact the lumber pieces 12 which are staged thereabove upon the lumber in-feed conveyance means 18. The stickers 15 are thereby sandwiched between the respective sticker tray 84 and the lumber pieces 12 as the lumber pieces are lifted off of the lumber in-feed conveyance means 18 by upwardly movement of the fork assembly 24. The course of lumber pieces 12 is then placed upon a previously formed course of lumber pieces along with the stickers 15 which are located there between.

The sticker transfer means 80 functions by way of the frame members 87, 88 are caused to move along an arcuate path by way of a plurality of bellcranks 90 which are pivotally connected to the frame members 88 and to a shaft 89 that is rotationally supported on a framework 18. The shaft 89, in turn, is rigidly connected to a primary bellcrank 91 which is pivotally connected to a linkage 92 that is operatively supported on the framework 18. At least two shafts 89 are employed in the manner shown, wherein the shafts, together with the frame members 87, 88 and associated bellcranks 90 operate in the manner of a parallelogram four-bar-linkage.

The linkage 92 can be actuated by any of a number of actuating means, such as by way of the cam surface 94 and respective cam follower 93 as shown. However, as explained in the '787 patent, the linkage 92 is preferably actuated by a fork assembly actuating means (not referenced) so as to maintain synchronicity of movement with respect to the sticker transfer means 80 and the fork assembly 24. That is, by configuring the linkage 92 and the fork assembly 24 to be actuated by a common actuating means, the operation of the sticker transfer means 80 is synchronized with that of the fork assembly 24.

Another prior art form of sticker placer which is disclosed in the '787 patent can be understood by a close examination of FIGS. 10, 11, 12, 13, and 14. As shown in those figures, the sticker placer disclosed thereby includes a sticker in-feed conveyance means 73 as well as a sticker transfer means 80. While the sticker in-feed conveyance means 73 can be identical, or at least substantially similar, to that of the sticker placer described immediately above, the sticker transfer means 80 which is shown in FIGS. 10 through 14 of the '787 patent is substantially dissimilar to that of the sticker placer described immediately above.

As is seen in FIGS. 10 through 14 of the '787 patent, the sticker transfer means 80 shown therein comprises a pair of elongated, endless conveyer members 190 that are arranged so as to operate in a substantially convoluted, serpentine circuitous path. Additionally, the sticker transfer means 80 includes a series of substantially flat support brackets 86 which are connected a regular, predetermined intervals to a respective conveyor member 190. Each of the conveyor members 190 can be circulated about its respective path by way of a drive means 194.

As is seen, the path of each respective conveyor member 190 is established by way of various guide and drive sprockets 200, 201, 203, which are operatively located at precisely determined stationary positions relative to the fork assembly 24. The movement, along the respective circuitous paths, of the conveyor members 190 causes the respective support brackets 86 attached thereto to thereby contact and lift the stickers 15 off of the sticker in-feed conveyor means 73 and then to deposit the stickers upon the respective sticker trays 84 which are connected to each respective fork arm of the fork assembly 24. In this manner, the stickers 15 are moved from the sticker in-feed conveyance means 73 to the respective sticker trays 84, from whence the stickers are placed between successive courses of lumber pieces in conjunction with the formation of a stack of lumber.

Yet another form of sticker placer is disclosed by U.S. Pat. No. 4,324,521 to Lunden. The sticker placer of the '521 patent can be understood by a study of FIGS. 3, 4, 5, 6, and 7 thereof. With reference now to FIG. 3 of the '521 patent, the stickers 14 are brought into proximity with the respective fork arms 25 of a stacking apparatus by way of the sticker in-feed conveyance means 16. The sticker in-feed conveyance means 16 can be operatively supported on a stationary frame 15. The frame 15 comprises a vertical flange (not referenced) as well as a horizontal flange 47.

A series of rollers 29 as well as a series of pivots 44 are also each operatively supported on the frame 15. A carriage 28 is operatively disposed upon the series of rollers 29 so as to be movable along a horizontal path which is substantially parallel to the both the frame 15 and the sticker in-feed conveyance means 16. An actuating means (not shown) is employed to move the carriage 28 in a reciprocating motion while supported on the series of rollers 29. A sticker tray 27 is mounted on each fork arm 25, and is configured to receive and support a sticker 14.

A series of pivot shafts 38 are rotationally supported on the carriage 28 so as to pivot with respect thereto. A pair of spaced sticker support arms 40, as well as at least one crank arm 50, are rigidly connected to each pivot shaft 38. A cam roller 49 is rotationally mounted on one end of the crank arm 50 and is configured to be supported on the horizontal flange 47 of the frame 15, and to roll there along during movement of the carriage 28 with respect to the frame. A ramp 43 is rigidly connected to each pivot 44 so as to be pivotable along therewith relative to the frame 15. The cam roller 49 and the ramp 43 are positioned relative to one another, wherein movement of the carriage 28 causes the cam roller to move toward the ramp and to engage the ramp, whereupon the cam roller is caused to roll upwardly upon the inclined surface 45 provided by the ramp.

The FIGS. 4 through 7 of the '521 patent depict an operational sequence of the sticker placer disclosed thereby. As shown in FIG. 4 of the '521 patent, the cam roller 49 is supported upon the horizontal flange 47 of the frame 15. A sticker (not referenced) is shown to be supported on the sticker in-feed conveyance means 16. The fork arm 25 and associated sticker tray 27 are also shown to be positioned above the sticker in-feed conveyance means 16. The carriage 28 is poised so as to be moved horizontally to the right, whereby the cam roller 49 will be caused to move toward the ramp 43.

Moving now to FIG. 5 of the '521 patent, it is seen that the carriage 28 has moved to the right, whereby the cam roller 49 has been caused to roll upwardly upon the inclined surface 45 of the ramp 43. Moreover, the cam roller 49 has moved past the pivot 44, and has begun to move downwardly upon the declined surface 51 of the ramp 43. As is further seen, the rightward movement of the carriage 28, and the resulting movement of the cam roller 49 upon the ramp 43 has caused the sticker support arm 40 to pivot in a clockwise direction, whereby the sticker 14 has been contacted and lifted upwardly thereby from the sticker in-feed conveyance means 16.

As depicted, the support arm 40 is poised to deposit the sticker 14 upon the sticker tray 27 with further rightward movement of the carriage 28. That is, further rightward movement of the carriage 28 will cause the cam roller 49 to drop off the end of the ramp 43 so as to come to rest upon the horizontal flange 47 of the fame 15, in turn resulting in counterclockwise rotation of the support arm 40. Such counterclockwise rotation of the support arm 40, along with the continued rightward movement of the carriage 28 will cause the sticker 14 to be deposited into the sticker tray 27 as the cam roller 49 continues downward to come to rest upon the horizontal flange 47 of the frame 15.

With reference now to FIG. 6 of the '521 patent, the cam roller 49 is depicted as having dropped from the ramp 43 so as to come to rest upon the horizontal flange 47 of the frame 15. The carriage 28 is now poised to move leftward on a return leg of its reciprocating cycle of movement. As is seen, during such leftward movement of the carriage 28 relative to the frame 15, the cam roller 49 will be caused to roll upon the horizontal flange 47 of the frame.

Moving now to FIG. 7 of the '521 patent, the purpose of the pivotal nature of the ramp 43 and pivot 44 is apparent. That is, as the leftward movement of the carriage 28 continues, the cam roller 49 contacts the lower surface 46 of the ramp 43 so as to cause the ramp to pivot in a clockwise direction about the pivot 44. The cam roller 49 thereby passes beneath the ramp 43 by pushing the ramp upward. As the leftward movement of the carriage 28 continues, the cam roller 49 passes the end 52 of the ramp 43, whereupon the ramp reverses its movement and pivots in a counterclockwise direction under the force of gravity so as to return to a rest position, wherein the end is in contact with the horizontal flange 47 of the frame 15. The carriage 28 continues its leftward movement until it achieves the relative position depicted in FIG. 4, from whence the cycle described above is repeated to place another sticker 14 into the sticker tray 27.

Still another form of sticker placer is disclosed by U.S. Pat. No. 5,720,592 to Gillingham et al. The sticker placer of the '592 patent can be understood by an examination of FIGS. 8 and 9 thereof. As depicted in FIGS. 8 and 9, the stickers 73 are brought into proximity with the fork arms 32 by way of the sticker in-feed conveyance means 21. A respective sticker tray 22 is pivotally connected to each fork arm 32 by way of a respective hinge 93. A respective pivot arm 98 is rigidly connected to each sticker tray 22. A linkage 100 is operatively connected to each pivot arm 98, as well as to an actuator 103, wherein actuation of the actuator causes pivoting of the sticker trays 22 by way of the linkage and respective pivot arm.

Thus, when the respective stickers 73 have approached to within a given proximity of the corresponding sticker tray 22, a first actuation of the actuator 103 causes the sticker trays to pivot downward. The movement of the sticker in-feed conveyance means 21 continues so as to position the respective stickers 73 substantially above the corresponding sticker trays, wherein a second actuation of the actuator 103 opposite the first actuation causes the sticker trays to pivot upward, whereby, together with upward motion of the fork arms 32, the respective stickers are cradled within the corresponding sticker tray and lifted upwardly from the sticker in-feed conveyance means.

As mentioned briefly above, a rake-off, or stripping, device is typically employed in conjunction with prior art stacking apparatus to facilitate transfer of lumber pieces from the fork assembly to the stack. Returning now to the '787 patent, a typical rake-off device is disclosed therein. The rake-off device of the '787 patent can be understood from an examination of FIGS. 3, 4, and 5. Referring to FIGS. 3, 4, and 5 of the '787 patent, the rake-off device 56 typically includes at least one cross bar 61 that is oriented transversally relative to the fork arms 24 of the fork assembly 25. The cross bar 61 is typically suspended from overhead by way of a chain 63. The movement of the cross bar 61 is typically restricted to a substantially vertical path.

The chain 63 is typically employed to control the movement of the cross bar 61, wherein the cross bar is selectively moved between a lower stripping position and an upper clear position in synchronization with the movement of the fork assembly 25. That is, as the fork assembly 25 moves the lumber pieces 12 from the pickup station (not shown) to the stacking station (not shown), the cross bar 61 remains in the clear position, wherein the lumber pieces and fork assembly pass unheeded beneath the cross bar. However, when the fork assembly 25 reaches its fully extended position above the stack at the stacking station, the cross bar 61 is typically deployed by lowering from the clear position into the stripping position.

When deployed in the stripping position, the cross bar 61, by way of a plurality of spaced stripping surfaces 68 attached thereto, prevents further movement of the lumber pieces 12 while the fork assembly 25 moves back toward the pickup station. That is, the cross bar 61, while suspended by the chain 63, is lowered into the stripping position after the fork assembly 25 and the lumber pieces 12 have reached the stacking station, but before the fork assembly returns to the pickup station. The cross bar 61 and associated stripping surfaces 68, while in the stripping position, are strategically located relative to the fork arms 24 such that the fork arms can pass freely back to the pickup station, while the lumber pieces 12 are prevented, by way of contact with the stripping surfaces, from movement toward the pickup station. In this manner, the lumber pieces 12 are raked, or stripped, from the fork arms 24 as the result of the withdrawal of the fork assembly 25 from the stacking station. The course of lumber pieces 12 is thus deposited at the stacking station to form a stack of lumber pieces.

The stickers (not shown) are typically raked, or stripped, from the associated sticker trays in a similar manner. That is, the rake-off device is deployed between strokes of the fork assembly so as to contact the stickers and thereby rake the stickers from the sticker trays as the fork arms and sticker trays are withdrawn from the stacking station on the return stroke of the fork assembly.

Although prior art sticker placers and rake-off devices such as those described above have been known to perform satisfactorily, it can be appreciated that certain disadvantages can be associated with the configurations thereof. Specifically, the complex design and high parts-count of the prior art sticker placers can result in expenditures of excessive quantities of resources toward the resolution of maintenance and repair issues. For example, a tolerance buildup due to degradation and wear of interconnected components of a typical prior art sticker placer can lead to unacceptable performance which can be remedied only by extensive overhaul and rework of the components.

Furthermore, the form and configuration of the prior art sticker placers can tend to limit the usefulness thereof. For example, the prior art sticker placers are generally not capable of removing stickers from the sticker trays once the stickers are deposited in the trays. This can prove disadvantageous in the event that the stickers must be removed from the trays. Removal of stickers from sticker trays in prior art apparatus typically requires that the entire stacking apparatus and associated components be shut down and that a safety lockout of the apparatus be performed in preparation for manual removal of the stickers.

As another example of the limiting nature of the prior art sticker placer configurations, the stroke of movement of the prior art configurations is generally limited, thus limiting the depth of the fork arms with which the sticker placer can be employed. That is, as stacking apparatus increase in size and capacity, the depth of the fork arms is generally required to increase.

Such an increase in the depth of the fork arms requires that the stickers be lifted a greater distance from the sticker in-feed conveyance means to the sticker trays. However, due to the prior art sticker placer configurations are limited with respect to the stroke of movement, and thus the distance of which the stickers can be lifted from the sticker in-feed conveyance means.

Moreover, disadvantages can be similarly associated with the configurations of prior art rake-off devices. Specifically, the configuration of such prior art rake-off devices limits the precision and speed with which the rake-off device can be positioned relative to the fork arm and sticker trays, thus limiting the overall operational speed and efficiency of the associated stacking apparatus.

What is needed then are information system methods and apparatus which achieve the benefits to be derived from similar prior art methods and/or devices, but which avoid the shortcomings and detriments individually associated therewith.

SUMMARY

The various embodiments of the present invention provide for a sticker handling apparatus for use in lumber stacking operations wherein automatic lumber stacking devices and related components are employed. In particular, the sticker handling apparatus in accordance with the various embodiments of the present invention include an actuating assembly that includes a first actuator and a second actuator, each of which is independently controllable. The apparatus in accordance with various embodiments of the present invention also include a sticker support bracket. One or more sticker support brackets can be supported by the actuating assembly so as to be selectively moved thereby. Such movement of the sticker support bracket by the actuating assembly can cause the sticker support bracket to contact and lift the sticker from a sticker in-feed conveyor to a respective sticker tray on a fork arm. The sticker support bracket defines a cradle area for supporting at least a portion of the sticker during transfer thereof. The cradle area is preferably three-sided, having a substantially flat and horizontal sticker support surface located between to substantially upright horns which extend substantially longitudinally upward from the support surface.

At least one embodiment of the present invention also includes a rake-off device that incorporates a cross bar having a roller operatively supported thereon. The roller is configured to come into contact and roll upon an upper surface of an associated fork arm to facilitate the provision of substantial vertical alignment and guidance of the rake-off device during stripping of the sticker from the sticker tray.

DETAILED DESCRIPTION

Apparatus in accordance with various embodiments of the present invention include various means of automatically handling stickers in conjunction with the automatic stacking of lumber in an automatic lumber stacking device. In accordance with one embodiment of the present invention, a sticker handling apparatus includes a sticker support bracket and an actuating assembly by which the sticker support bracket is supported. The actuating assembly includes a first actuator and a second actuator. The first actuator is configured to impart motion to the sticker support bracket in a first dimension, while the second actuator is configured to impart motion to the sticker support bracket in a second dimension, wherein the first dimension and the second dimension are oriented in different directions. Selective actuation, or operation, of the first actuator and the second actuator can cause the sticker support bracket to move in a manner wherein the sticker support bracket lifts at least a portion of a sticker from a sticker in-feed conveyor and onto a sticker tray. The actuating assembly is capable of moving the sticker support bracket in such a manner without any substantial rotation of the sticker support bracket.

Figure 1:
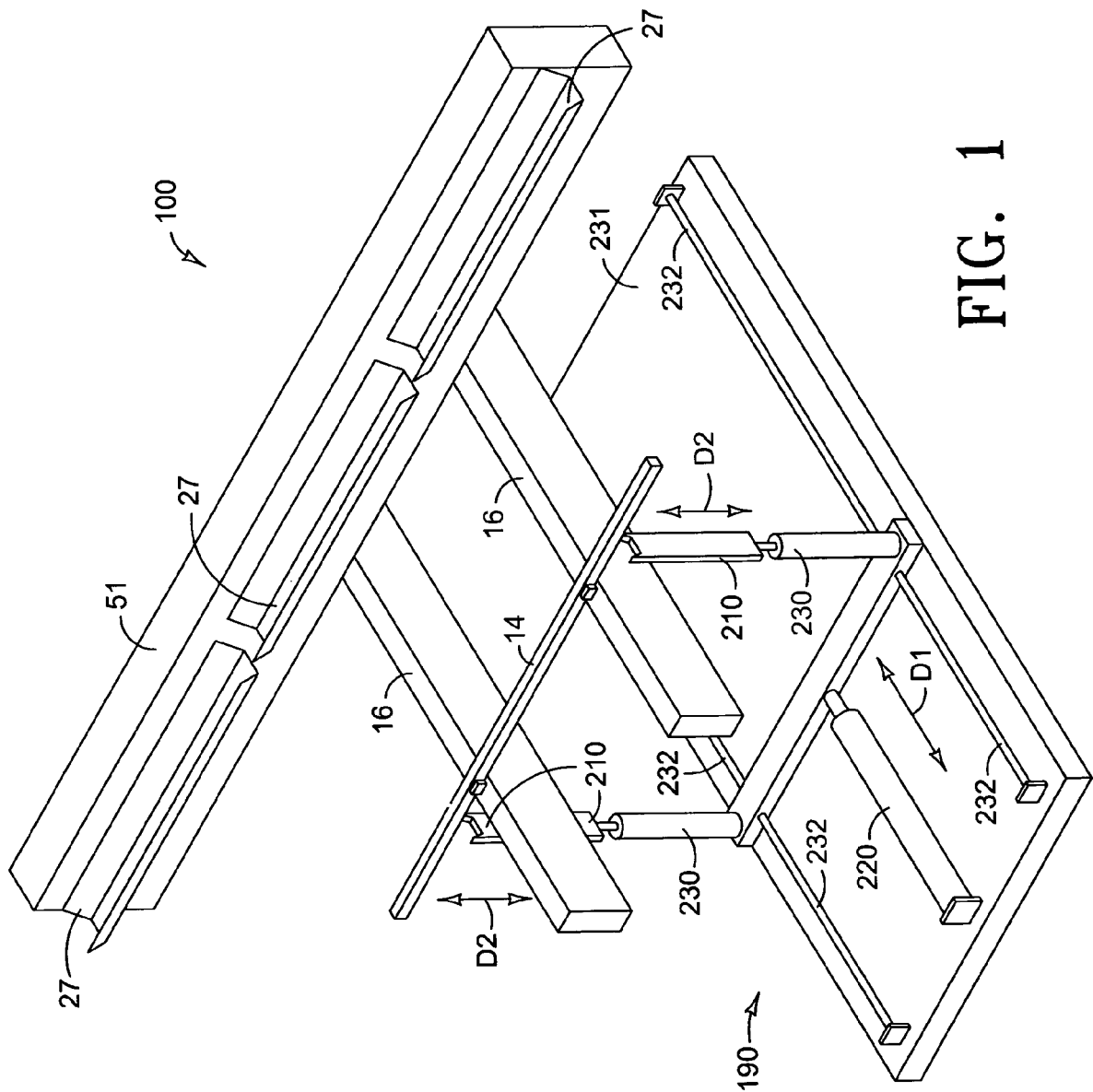
FIG. 1 is an isometric view that depicts an apparatus in accordance with one embodiment of the present invention.

Turning now to FIG. 1, an isometric view is shown in which an apparatus 100 in accordance with one embodiment of the present invention is depicted. It is understood that the apparatus 100 is depicted in a simplified form for the sake of clarity. That is, it is understood that the general operation and configuration of prior art lumber stacking device are well known and have been explained hereinabove in conjunction with the discussion of several prior art patents. Further, it is understood that the present invention pertains only to several of the many aspects and features of functional lumber stacking devices.

Thus, in the interest of clearly presenting the relevant aspects and features of the present invention, those aspects, features, functions, operations, and the like, of a lumber stacking device which are not the subject of the present invention and which are known and understood, will not be discussed or shown in detail. Further, some aspects and features, and the like, of a typical functioning lumber stacking device are not shown or discussed herein with the understanding that detailed discussion of such aspects and features would have been redundant and would have detracted from the presentation and explanation of the various aspects, features, and elements of the present invention.

Still referring to FIG. 1, the apparatus 100 can be employed with a sticker in-feed conveyor 16, as well as a fork arm 51 that is part of a fork assembly (not shown) of a lumber stacking device. The fork arm 51 can support thereon an associated sticker tray 27, as is depicted. The apparatus 100 includes at least one sticker support bracket 210. The sticker support bracket 210 is configured to support at least a portion of a sticker 14 while the sticker is moved from the sticker in-feed conveyor 16 to the sticker tray 27. That is, the apparatus 100 can include, for example a pair of sticker support brackets 210 as is exemplified in FIG. 1, wherein such a pair of sticker support brackets is configured to fully support the sticker 14 as the sticker is moved from the sticker in-feed conveyor 16 to the sticker tray 27.

The apparatus 100 also includes an actuating assembly 190. The actuating assembly 190 is configured to move the one or more sticker support brackets 210, wherein such movement of the one or more sticker support brackets can cause at least one sticker 14 to be moved from the sticker in-feed conveyor 16 to the sticker tray 27. As is discussed below in greater detail, the support brackets 210 can also be moved by the actuating assembly 190 in a manner wherein the respective sticker 14 can be removed from the sticker tray 27.

Moreover, as is also apparent from the discussion below, the actuating assembly is configured to function in a manner wherein movement thereby of the sticker support brackets 210 is accomplished without substantial rotation thereof. That is, the actuating assembly 190 is configured to support thereon at least one sticker support bracket 210, wherein the actuating assembly is further configured to move the sticker support brackets in such that the sticker support brackets contact and lift the sticker 14 from the sticker in-feed conveyor 16 and then place the sticker onto the sticker tray 27, and/or remove the sticker from the sticker trays, and/or replace the sticker onto the in-feed conveyor, without substantial rotation of the sticker support brackets. The term "rotation" as used herein, means "change in angular alignment, or angular change in orientation." As can be appreciated from the above discussion as well as that below with regard to the non-rotational nature of the sticker support bracket 210, it can be appreciated that such a feature can prove beneficial in placing the sticker 14 into the sticker tray 27. More specifically, because the sticker support bracket 210, and thus also the sticker 14, do not substantially rotate during movement of the sticker between the in-feed conveyor 16 and the sticker tray 27, the likelihood of the sticker being placed into the sticker tray on edge, or in a rotationally mis-aligned state, is substantially decreased over that of the prior art devices. Moreover, this non-rotational nature of the sticker support bracket 210 further contributes to the capability of the apparatus 100 to selectively remove the sticker 14 from the sticker tray 27 as is also described in greater detail below.

With continued reference to FIG. 1, the actuating assembly 190 includes at least a first actuator 220 as well as a second actuator 230. The first actuator 220 is configured to move the sticker support bracket 210 in a first dimension D1 and the second actuator 230 is configured to move the sticker support bracket in a second dimension D2. The first dimension D1 and the second dimension D2 can be oriented in any direction, although the not in the same direction. That is, the first dimension D1 is different from the second dimension D2.

For example, the first dimension D1 can be oriented in a substantially horizontal direction, while the second dimension D2 can be oriented in a substantially vertical direction, as is depicted. As a further example, the first dimension D1 can be oriented in a substantially vertical direction while the second dimension D2 can be oriented in a substantially horizontal direction. However, it is understood that neither the first dimension D1 nor the second dimension D2 are required to be horizontal and/or vertical.

Additionally, while the first dimension D1 and the second dimension D2 are each depicted as being substantially linear, either one or both of the first dimension and the second dimension can be non-linear. Furthermore, although the first dimension D1 and the second dimension D2 are depicted as being substantially transversely oriented relative to one another, this is not required in accordance with at least one embodiment of the present invention. Moreover, the first actuator 220 and the second actuator 230 are independently controllable relative to one another. That is, the first actuator 220 can be actuated, or operated, irrespective of the second actuator 230, and vice versa, as is explained in greater detail below.

It is understood that actuators are well known, and that a nearly limitless number of variations thereof can be assembled from different components including, motors, hydraulic and pneumatic cylinders, drive linkages, guides, and the like. For example, although linear actuators are depicted in the accompanying drawings, it is understood that rotary actuators, such as stepper motors or the like, can be alternatively employed. Furthermore, as is mentioned above, the term "actuator" as used herein can include various mechanisms and/or linkages for transforming and/or transmitting motion and/or mechanical power. For example, an actuator can include a chain-and-sprocket or a rack-and-pinion device for transforming rotary motion into linear motion, or vice versa.

Thus, the graphical symbols shown in the accompanying figures are employed to generally represent respective actuators and are not intended represent specific forms thereof. It is therefore understood that the various embodiments of the present invention are not limited to any particular configuration or form of actuators or actuating mechanisms. Moreover, it is understood that a different number of actuators can be alternatively employed where a specific number of actuators is depicted. For example, two or more actuators configured to impart motion to the sticker support bracket 210 in a single dimension can be replaced by one actuator and an associated guide mechanism, or vice versa.

With continued reference to FIG. 1, the actuating assembly 190 is configured in a manner whereby selective actuation, or operation, thereof can cause movement of the sticker support bracket 210 either only in the first dimension D1, or only in the second dimension D2, or simultaneously in both the first dimension and the second dimension. That is, the actuating assembly 190 in such a manner wherein the first actuator 220 and the second actuator 230 can each be selectively and independently controlled so as to move the sticker support bracket 210 along any path that lies within a plane that is parallel to both the first dimension D1 and to the second dimension D2.

Thus, as can be appreciated from the foregoing discussion with reference to FIG. 1, the actuating assembly 190 is configured to move the sticker support bracket 210 in the first dimension D1 and/or in the second dimension D2 with substantially no corresponding rotation of the sticker support bracket. That is, the actuating assembly 190 is configured to move the sticker support bracket 210 in the first dimension D1 and/or the second dimension D2 without changing the angular orientation or angular alignment of the sticker support bracket. Stated yet another way, the actuating assembly 190 is configured to move the one or more sticker support brackets in the manner described above during which movement the one or more sticker support brackets remain in substantially constant alignment with a given direction.

It is understood that a control system (not shown), such as a control system known to those in the art can be employed to control the actuation, or operation, of the actuating assembly 190. More specifically, such a control system can be employed to control the actuation of the first actuator 220 and the second actuator 230 so as to control the movement of the sticker support members 210 in a way that will result in movement of the sticker 14 from the sticker in-feed conveyor 16 to the sticker tray 27, and in other movements of the sticker support bracket as are contemplated by the various embodiments of the invention.

More specifically, it is understood that selective actuation and/or control of the first actuator 220 and the second actuator 230, as well as any other mechanism or device shown or described herein, can be achieved by means which are well known and understood in the art. That is, various prior art controllers (not shown) such as Programmable Logic Computers ("PLC's") and the like, which incorporate various data processing components such as digital processors, data storage memories, and the like, can be employed in conjunction with various other control devices such as proximity sensors, limit switches, and the like, to selectively control and modulate the performance, including the actuation, of the horizontal and vertical actuating mechanisms 220 and 230, respectively. Therefore, because such aspects are well known, they are not described or shown herein.

With continued reference to FIG. 1, the actuating assembly 190 can include a base 231. The base 231 can be configured so as to remain substantially stationary. That is, the base 231 can be configured to rest on a floor (not show) or other like foundational support. The actuating assembly 190 can further include at least one guide 232 that is supported by the actuating assembly. A carriage member 160 can also be included in the actuating assembly 190 as is depicted. The carriage member 160 can be engaged with the guide 232, wherein movement of the carriage member is substantially restrained to the first dimension D1.

As is further shown in FIG. 1, the second actuator 230 can be supported on the carriage member 160. In this manner, the first actuator 220 can be operatively connected to the base 231 and supported thereby. Furthermore, the first actuator 220 can be configured to remain substantially stationary relative to the base 231, including during operation of the first actuator. Moreover, the second actuator 230 can be operatively connected between the first actuator 220 and the sticker support bracket 210, wherein selective operation of the first actuator causes movement of the second actuator and the sticker support bracket relative to the base in the first dimension D1.

Figure 2:
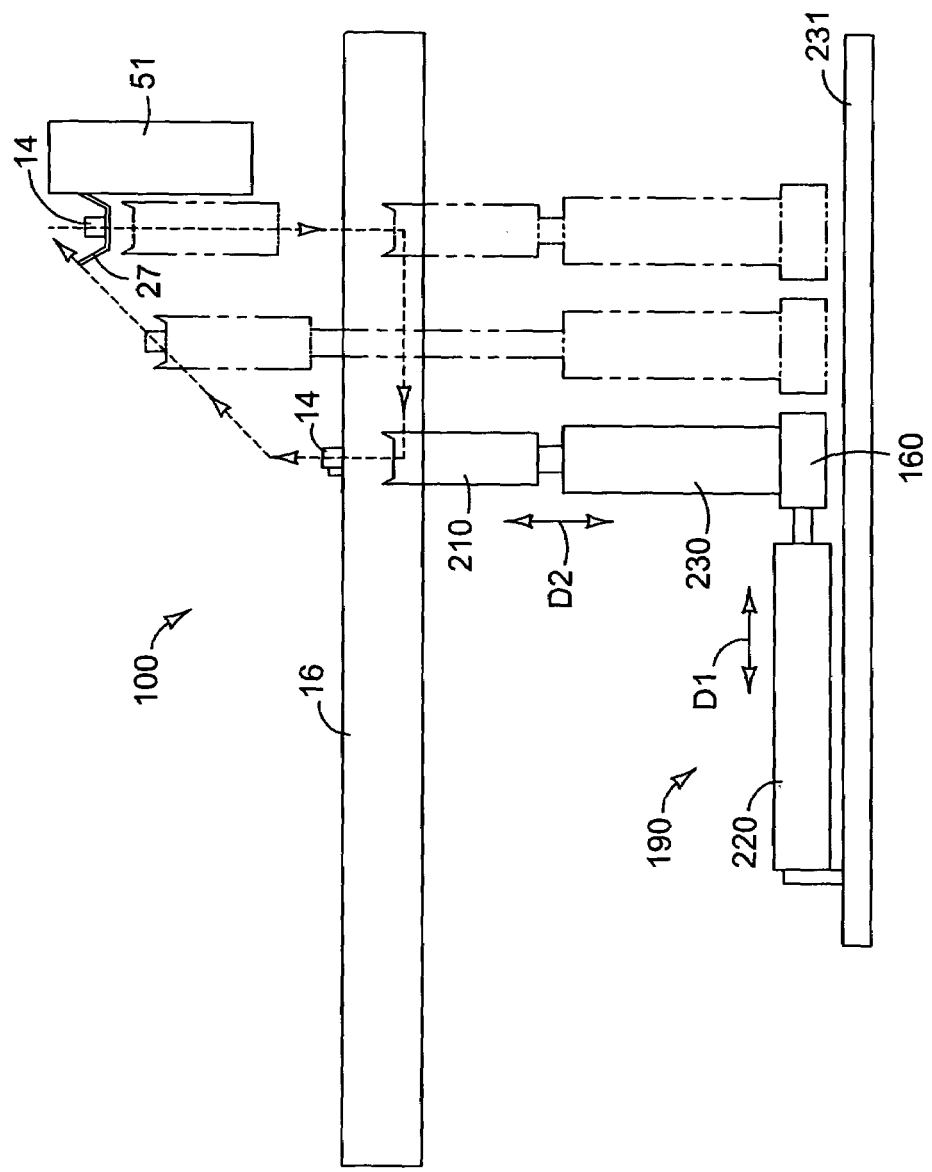
FIG. 2 is a side elevation view that depicts the apparatus of FIG. 1, showing a sequence of motion of the sticker support bracket.
Figure 3:
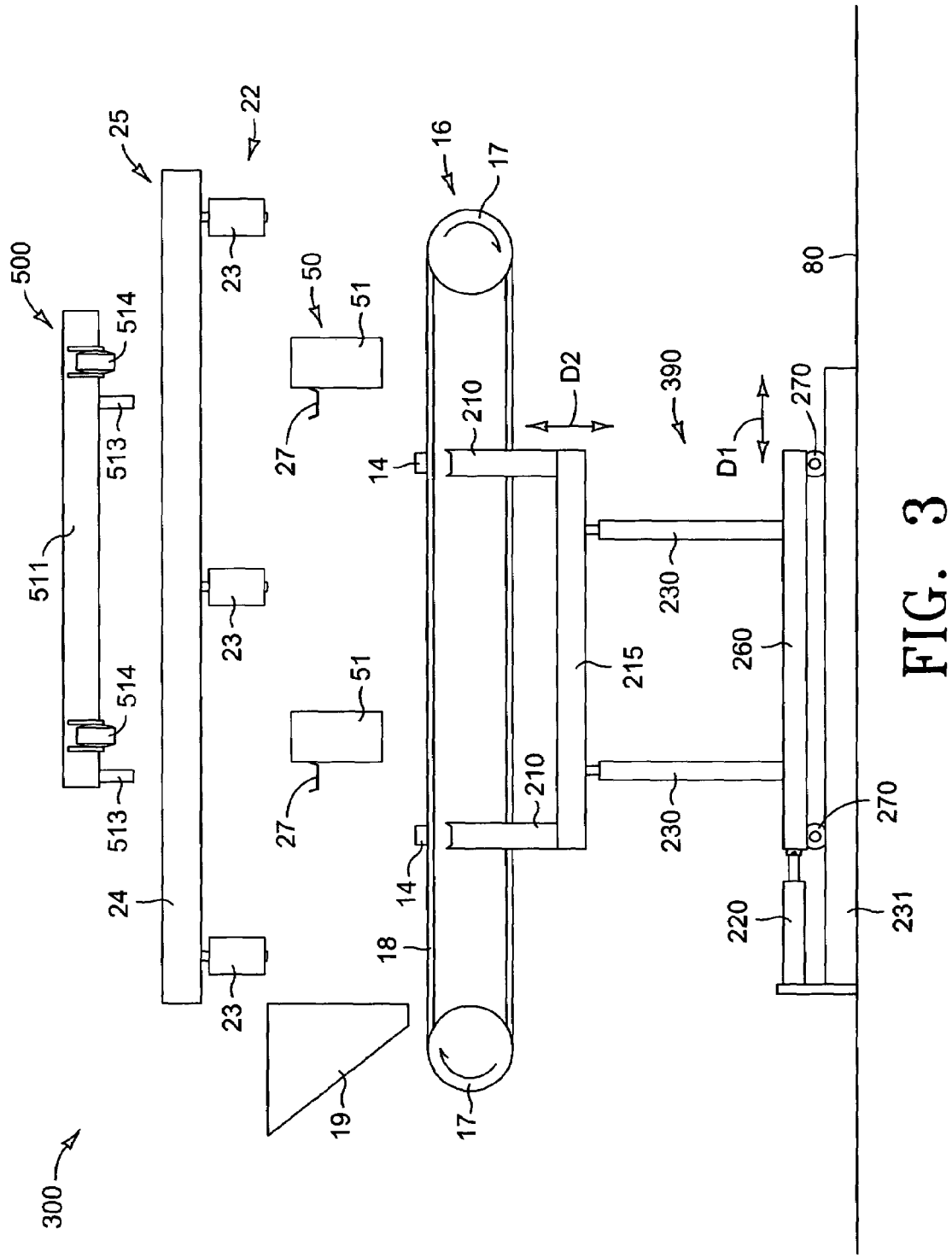
FIG. 3 is a side elevation view that depicts an apparatus in accordance with another embodiment of the present invention.

Also, such a configuration can enable selective operation of the second actuator 230 to cause movement of the sticker support bracket 210 relative to the base 231 in the second dimension D2. As is already mentioned above, such movement of the sticker support bracket 210 by the actuating assembly 190 in the manner described above can be achieved without substantial rotation of the sticker support bracket during such movement or as the result of such movement. That is, the actuating assembly 190 is configured to move the sticker support bracket 210 in either the first dimension D1 as the result of actuation of the first actuator 220, or in the second dimension D2 as the result of actuation of the second actuator 230, or simultaneously in both the first dimension and the second dimension as the result of simultaneous actuation of both the first actuator and the second actuator, wherein during such movement the angular orientation, or alignment, of the sticker support bracket remains substantially unchanged. Turning now to FIG. 2, a side elevation view is shown in which the apparatus 100 of FIG. 1 is depicted. It is understood that the guide 232 is omitted from FIG. 2 for clarity. FIG. 2 illustrates one possible path of the sticker support bracket 210 during movement of the sticker 14 from the sticker in-feed conveyor 16 to the sticker tray 27. For example, a possible sequence of movement of the sticker support bracket 210 can begin with the sticker support bracket located directly under the sticker 14 with the sticker supported on the sticker in-feed conveyor 16. Furthermore, in accordance with such an example, the second actuator 230 can then be actuated, or operated, whereby the sticker support bracket 210 is moved primarily in the second dimension D2 to lift the sticker 14 from the sticker in-feed conveyor 16. Both the first actuator 220 and the second actuator 230 can then be actuated, or operated, either simultaneously or individually, whereby the sticker support bracket 210 with the sticker 14 supported thereon is moved simultaneously in both the first dimension D1 and the second dimension D2 to position the sticker directly above the sticker tray 27. The second actuator 230 can then be actuated, or operated, yet again, whereby the sticker support bracket 210 is moved primarily in the second dimension D2 to place the sticker 14 in the sticker tray 27. The first actuator 220 can then be actuated, or operated, yet again, whereby the sticker support bracket 210 is moved to its original position directly below another incoming sticker 14. It can be appreciated that during such movement of the sticker support bracket 210 by the actuating assembly 190, there is no substantial rotation of the sticker support bracket. That is, the angular orientation of the sticker support bracket 210 does not substantially change during such movement thereof. Therefore, the sticker 14 can be moved from the sticker in-feed conveyor 16 to the sticker tray 27 by the apparatus 100 without substantial rotation of the sticker. As can further be appreciated from a study of FIG. 2, the first actuator 220 and the second actuator 230 can be selectively controlled, or actuated, such that the sticker support bracket 210 can be moved along any of a nearly limitless number of possible paths. That is, the path of the sticker support bracket 210 as it is moved by the actuation of the first actuator 220 and the second actuator 230 can be varied in accordance with various requirements and or criteria. In other words, the path of the sticker support bracket 210 as moved by the actuation of the first actuator 220 and the second actuator 230 is not fixed, but is variable. However, it is understood that the path of the sticker support bracket 210 is also repeatable. For example, as an alternative to the path of the sticker support bracket 210 specifically depicted in FIG. 2, the sticker support bracket can be moved from a position substantially directly beneath the sticker tray 27. That is, the apparatus 100 is configured such that a sticker 14 can be positioned on the sticker in-feed conveyor 16, wherein the sticker is located substantially directly below the sticker tray 27. In such a circumstance, the actuating assembly 190 can be actuated in a manner whereby the sticker support bracket 210 is moved substantially only in the second dimension D2 to lift the sticker off of the in-feed conveyor 16 and to place the sticker proximate the sticker tray 27. Thus, in such a circumstance, only minimal movement of the sticker support bracket 210 in the first dimension D1 would be required to place the sticker 14 into the sticker tray 27. It can be appreciated that such capability of the apparatus 100 can be beneficial in situations wherein several fork arms 51 are spaced extremely close together. In such situations, the apparatus 100 is capable of moving a sticker 14 from the sticker in-feed conveyor 16 to the sticker tray 27 as long as the spacing between the sticker tray and an adjacent fork arm 51 is no less than the width of the sticker support bracket 210. Also, in such situations, the operational vertical distance between the sticker in-feed conveyor 16 and the sticker tray 27 is determined only by the travel of the sticker support 210 in the second dimension D2 which can be practically unlimited. Turning now to FIG. 3, a schematic side elevation view is shown which depicts an apparatus 300 in accordance with another embodiment of the present invention. As is apparent in the discussion below, the apparatus 300 can be substantially similar to the apparatus 100 which is discussed above with reference to FIGS. 1 and 2. As is seen with reference to FIG. 3, the apparatus 300 includes an actuating assembly 390 which can function in a manner substantially similar to that of the actuating assembly 190 which is described above with reference to the apparatus 100 shown in FIGS. 1 and 2. Still referring to FIG. 3, the apparatus 300 can be employed in conjunction with a lumber in-feed conveyor 22 on which a course, or layer, 25 of lumber pieces, or boards, 24 is accumulated in preparation for the formation of a stack of lumber (not shown). The lumber pieces 24 are accumulated and formed into a lumber course 25 at a pick-up station 15. The lumber in-feed conveyor 22 can be configured in the manner of a typical prior art lumber in-feed conveyor, and can include several lumber in-feed conveyor elements 23 on which the lumber pieces 24 are supported. The apparatus 300 can also be employed along with a fork assembly 50 that, in turn, includes a plurality of substantially parallel fork arms 51 which are depicted in end view. Each of the fork arms 51 has an associated sticker tray 27 connected thereto, as is shown. Each fork arm 51 has a substantially flat upper surface 52 defined thereon. The fork assembly 50 is configured to move in an upwardly direction, wherein the upper surface 52 of each fork arm 51 contacts the lumber course 25 to lift the lumber course from the lumber in-feed conveyor 22. The fork assembly 50 is configured to lift the lumber course 25 from the number in-feed conveyor 22 at the pick-up station 15 in the manner discussed above with respect to the prior art, wherein successive lumber courses are moved from the pick-up station to a stacking station (not shown) where a lumber stack is formed. As is further depicted by FIG. 3, the apparatus 300 can be further employed with a sticker in-feed conveyor 16. The sticker in-feed conveyor 16 is described above, and can be configured in the manner of a typical prior art sticker in-feed conveyance means such as that which is discussed above with respect to the prior art. The sticker in-feed conveyor 16 can include, for example, a pair of sprockets 17, or the like, on which a conveyor chain 18, or the like, is operatively supported. A sticker distribution device 19, such as a sticker feeder or the like, is preferably included with the in-feed conveyor 16, and is configured to selectively distribute stickers 14 on the sticker in-feed conveyor at predetermined intervals.

The apparatus 300 can further include a rake-off device 500. The rake-off device 500 is briefly described here and is described in greater detail below. The rake-off device 500 is employed to remove the stickers 14 from the respective sticker trays 27 at the stacking station (not shown). The rake-off device 500 can include a rake-off bar 511 which has, operatively supported thereon, at least one roller 514 that is configured to contact and roll upon the upper surface 52 of an associated fork arm 51 as is described in greater detail below. Still referring to FIG. 3, the actuating assembly 390 can include a base 231 which is described above. The base 231 can be configured to rest upon a floor 80 or the like. The actuating assembly 390 can also include a carriage member 260 that is movably supported by the base, whereby the carriage member is configured to move in the first dimension D1 relative to the base. The carriage member 260 can be configured to function in a manner substantially similar to that described above with reference to the apparatus 100 shown in FIGS. 1 and 2. However, as is shown in FIG. 3, rollers 270 can be employed to enable the carriage member 260 to move relative to the base 231. Alternatively, a guide or the like can be employed, such as the guide 232 which is discussed above with reference to the apparatus 100 shown in FIGS. 1 and 2. It is understood that other means can be alternatively employed to enable the carriage member 260 to move in the first dimension D1 relative to the base 231. For example, various slide mechanisms and/or various guides or the like can be employed in place of the rollers 270 in order to enable movement of the carriage member 260 in the first dimension D1. The actuating assembly 390 can further include a support member 215 that is supported by the carriage member 260. That is, the support member 215 is configured to move with the carriage member 260 in the first dimension D1. The actuating assembly 390 also includes a first actuator 220 and at least one second actuator 230, which are both described above. The first actuator 220 can be connected between the base 231 and the carriage member 260, whereby actuation of the first actuator causes movement of the carriage member 260 in the first dimension D1 relative to the base 231. The actuating assembly 390 also includes a second actuator 230 that is supported by the carriage member 260 as shown The second actuator 230 can be configured as is shown, whereby the second actuator can be actuated, or operated, to cause the support member 215 to be moved in the second dimension D2 relative to the carriage member 260. It is understood that the actuating assembly 390 can be configured in a manner wherein the respective angular orientations of both the carriage member 260 and the support member 215 do not change as the result of any actuation of the first actuator 220 and/or the second actuator 230. That is, the carriage member 260 and the support member 215 can remain substantially parallel to the base 231 during actuation of the first actuator 220 and/or the second actuator 230. As is seen, at least one sticker support bracket 210 can be included in the sticker placing apparatus 300, wherein the sticker support bracket can be supported by the support member 215. More specifically, the apparatus 300 can include a plurality of sticker support brackets 210 that are substantially rigidly supported by the support member 215, and wherein the plurality of sticker support brackets are configured to simultaneously move a plurality of stickers 14 from the sticker in-feed conveyor 16 to the sticker tray 27. That is, the apparatus 300 can include a plurality of sticker support brackets 210 that are each substantially fixedly supported by, or connected to, the support member 215, whereby movement of the support member results in corresponding and equal movement of each of the plurality of sticker support brackets. It is understood that the spacing of corresponding pairs of sticker support brackets 210 on the support member 215 can beneficially correspond to the spacing of the respective sticker trays 27 supported on the corresponding fork arms 51. In this manner, the plurality of stickers 14 can simultaneously be lifted from the in-feed conveyor 16 and be placed into each respective sticker tray 27 as the result of a continuous movement of the plurality of sticker support brackets 210.

Notwithstanding the difference between the respective configurations of the apparatus 100 and the apparatus 300, both of which are discussed above, it can be appreciated that both of the above described apparatus can be made to operate in substantially similar manners with regard to their intended function of moving the sticker 14 front the sticker in-feed conveyor 16 to the respective sticker tray 27, and which manners of movement are described above in detail with reference to the apparatus 100. Specifically, with continued reference to FIG. 3, the support member 215 along with the sticker support brackets 210 supported thereby can be initially located substantially beneath the respective stickers 14 while the stickers are supported upon the sticker in-feed conveyor 16, wherein the stickers have been brought into position thereon. The actuating assembly 390 can then be selectively actuated in a manner substantially similar to that described above with respect to the apparatus 100, wherein each sticker 14 is substantially simultaneously contacted and lifted off the sticker in-feed conveyor 16 by a respective sticker support bracket 210 and substantially simultaneously placed onto a respective sticker tray 27.

That is, as is discussed above, the apparatus 300 includes the actuating assembly 390 which in turn includes the first actuator 220 that can be selectively actuated to move the carriage member 260 relative to the base in the first dimension D1. The first dimension D1 can be oriented in any direction, such as the horizontal direction as is depicted. The actuating assembly 390 also includes the second actuator 230 that can be selectively actuated to move the support member 215 relative to the carriage member 260 in the second dimension D2.

Figure 4:
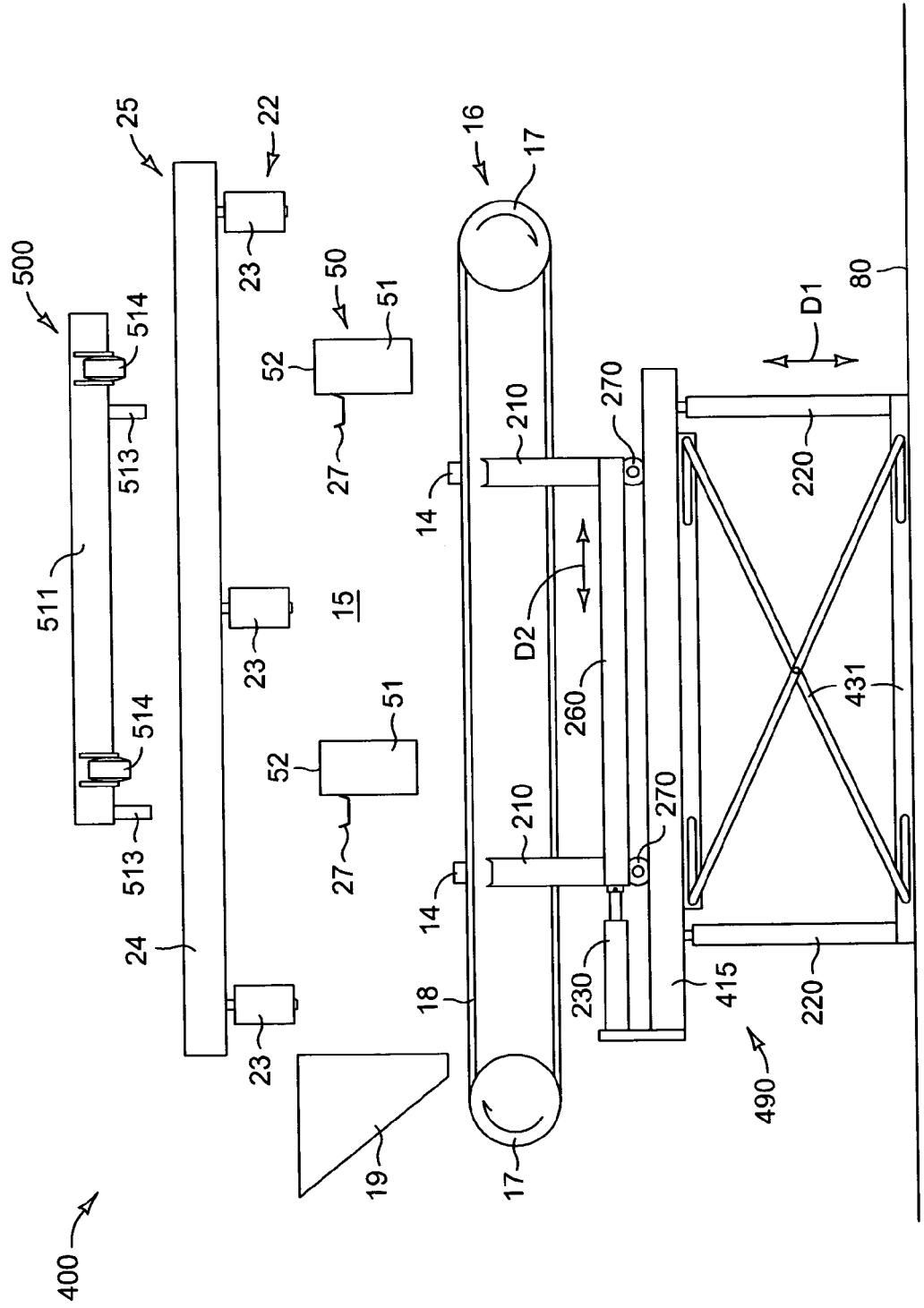
FIG. 4 is a side elevation view that depicts an apparatus in accordance with yet another embodiment of the present invention.

The second dimension D2 can be oriented in any direction except that of the first dimension D1. For example, the second dimension D2 can be oriented in vertical direction as is depicted. In this manner, the actuating assembly 390 can be selectively actuated so as to simultaneously move a plurality of stickers 14 from the in-feed conveyor 16 to respective sticker trays 27 without substantial rotation of the sticker support brackets 210, and without substantial rotation of the stickers. Turning now to FIG. 4 a side elevation view is shown in which an apparatus 400 is depicted in accordance with yet another embodiment of the present invention. The apparatus 400 can be substantially similar to the apparatus 300 explained above with reference to FIG. 3. However, a primary difference between the apparatus 300 depicted in FIG. 3, and the apparatus 400 depicted in FIG. 4, is the configuration of the respective actuating assemblies, 390 and 490. That is, the apparatus 400 includes an actuating assembly 490 that is configured to perform a function similar to that performed by the actuating assembly 390 of the apparatus 300. However, the actuating assembly 490 can be configured differently than the actuating assembly 390 as is described in greater detail below. The actuating assembly 490 is configured to move at least one sticker support bracket 210 in a manner that will result in the movement of a sticker 14 from the sticker in-feed conveyor 16 to the respective sticker tray 27. That is, the actuating assembly 490 can be configured to simultaneously move a plurality of sticker support brackets 210 in a manner which results in a plurality of stickers 14 being simultaneously picked up from the sticker in-feed conveyor 16 and moved to respective sticker trays 27 by the sticker support brackets. As is explained above, the sticker support bracket 210 is configured to cradle at least a portion of the sticker 14 while the sticker is moved from the sticker in-feed conveyor 16 to the respective sticker tray 27. The actuating assembly 490 can include a stationary base 431 that can be substantially similar to the base 231 described above. The base 431 can include a guide or the like as shown in FIG. 4 and as explained in greater detail below. The actuating assembly 490 also includes at least one first actuator 220, which is explained above, and that is operatively supported by the base 431. The first actuator 220 can be configured to remain substantially stationary relative to the base 431 during actuation, or operation, of the first actuator.

The actuating assembly 490 can further include a support member 415 that can be substantially similar to the support member 215 that is explained above. The support member 415 can be at least partially operatively supported by the base 431, including any guide portion of the base such as depicted in FIG. 4. The first actuator 220 is operatively connected between the base 431 and the support member 415 in a manner whereby actuation of the first actuator can cause the support member 415 to move relative to the base 431 in the first dimension D1. It is understood that the base 431 and/or the support member 415 can be configured in respective manners wherein the angular orientation of the support member 415 remains substantially unchanged during movement of the support member in the first dimension D1.

With continued reference to FIG. 4, a second actuator 230 is also included in the actuating assembly 490. The second actuator 230 has been described above. As is shown, the support member 415 can be configured to support a carriage member 260 thereon. The carriage member 260 has been explained above. The second actuator 230 can be operatively connected between the support member 415 and the carriage member 260, whereby actuation of the second actuator causes movement of the carriage member relative to the base 431 and the support member in the second dimension D2. As is seen with reference to FIG. 4, the second actuator 230 can be configured to move along with the support member 415 in the first dimension D1 as the result of actuation of the first actuator 220. It is understood that the carriage member 260 and/or the support member 415 can be configured in respective manners, wherein the angular orientation, or alignment, of the carriage member 260 remains substantially unchanged during actuation of the first actuator 220 and/or the second actuator 230. That is, the actuating assembly 490 can be configured in such a manner that the support member 415 and the carriage member 260 remain substantially parallel to the base 431 at all times, including during actuation of the first actuator 220 and the second actuator 230. As is further seen, at least one sticker support bracket 210 can be supported by the carriage member 260. More specifically, a plurality of sticker support brackets 210 can be substantially rigidly connected to the carriage member 260 as is shown, whereby selective actuation of the first actuator 220 and the second actuator 230 can cause the plurality of sticker support brackets to move in a manner such that a plurality of stickers 14 are simultaneously lifted thereby from the sticker in-feed conveyor 16 and placed onto respective sticker trays 27. It is appreciated from the discussion above with reference to FIG. 4, as well as the foregoing discussion with reference to FIGS. 1 through 3, that the actuating assembly 490 is configured to simultaneously move a plurality of stickers 14 from the sticker in-feed conveyor 16 to respective sticker trays 27 without substantial rotation of any of the sticker support brackets. Thus, the actuating assembly 490 can also be configured to simultaneously move a plurality of stickers 14 from the sticker in-feed conveyor 16 to respective sticker trays 27 without substantial rotation of any of the stickers. That is, as is explained above, the apparatus 400 can include a substantially stationary base 431 and a support member 415 that is movably supported by the base, wherein the first actuator 220 is configured to move the support member relative to the base in the first dimension D1 which can be a substantially vertical direction, as is shown. Moreover, the apparatus 400 can include a carriage member 260 that is movably supported by the support member 415 and configured to move therewith relative to the base 431, wherein the second actuator 230 is configured to move the carriage member relative to the support member in the second dimension D2 which can be a substantially horizontal direction, and wherein one or more support brackets 210 are supported by the carriage member. With reference now to FIGS. 1 through 4, as well as the above discussion with reference thereto, it is to be understood that the term "operatively connected" as used herein is intended to be defined as a situation in which a first object is connected to a second object by way of any known means which can be employed to allow the intended operation to be performed. Accordingly, for example, the first actuator 220 can be operatively connected to the sticker support bracket 210 by way of any known force-transmitting means, such as linkages and the like, which will allow the first actuator to move the sticker support bracket in the first dimension D1. Likewise, the second actuator 230 can be operatively connected to the sticker support bracket 210 by way of any known means, such as linkages and the like, which will allow the second actuator to move the sticker support bracket in the second dimension D2. It is understood that the first actuator 220 and the second actuator 230 can both be operatively connected to the sticker support bracket 210 in a series configuration, wherein the second actuator is operatively connected between the first actuator and the support bracket. That is, the sticker support bracket 210 can be operatively connected to the second actuator 230, which in turn, can be operatively connected to the first actuator 220. In this manner, the first actuator 220 can be selectively operated so as to move both the second actuator 230 and the sticker support bracket 210 in the first dimension D1. Also, the second actuator 230 can be selectively operated so as to move the sticker support bracket 210 in the second dimension D2. Accordingly, when both the first actuator 220 and the second actuator 230 are operated simultaneously, the sticker support bracket 210 can be moved simultaneously in both the first dimension D1 and in the second dimension D2. Still referring generally to FIGS. 1 through 4, as well as the above discussion with reference thereto, the apparatus 100, 300, and 400 can be employed to move a sticker 14, or simultaneously move a plurality of stickers, from the sticker in-feed conveyor 16 to respective sticker trays 27. Additionally, however, each of the apparatus 100, 300, and 400 can be employed to selectively remove a sticker 14, or simultaneously remove a plurality of stickers, from respective sticker trays 27. Furthermore, the apparatus 100, 300, and 400 can be employed to not only remove the stickers 14 from the respective sticker trays 27, but also to place the stickers back onto the sticker in-feed conveyor 16. This function can allow the stickers 14 to be completely removed from a lumber stacking apparatus or the like after being placed on the respective sticker trays 27. Such removal of the stickers 14 from the sticker trays can prove to be advantageous from several standpoints, including the avoidance of requiring manual removal of the stickers from the sticker trays. The function of removing stickers 14 from the respective sticker trays 27 is enabled by one or more features of the various apparatus 100, 300, and 400 described herein. For example, the capability of the various actuation devices 190, 390, and 490 to move the sticker support bracket 210 in a substantially upward vertical direction coupled with the non-rotational nature of the sticker support bracket can enable the apparatus 100, 300, and 400 to successfully remove one or more stickers 14 from the respective sticker trays 27. Furthermore, the individually controllable nature of the first actuator 220 and the second actuator 230 enables the sticker support brackets 210 to be moved along virtually any path which, in turn, allows the stickers (once removed from the sticker trays 27) to be placed at selected locations on the in-feed conveyor 16.

With reference now to FIG. 2, such removal of the stickers 14 from the sticker trays 27 can be accomplished, for example, by selectively actuating, or operating, the first actuator 220 and the second actuator 230 in a manner that will cause the sticker support bracket 210 to move along a path and in directions thereon which are substantially opposite of those depicted in FIG. 2. That is, the actuating assembly 190, as well as other actuating assemblies in accordance with various embodiments of the invention as shown and discussed herein, can be operated in a manner such that the sequence of motion of the sticker support bracket 210 during movement of the sticker 14 from the in-feed conveyor 16 to the sticker tray 27 is substantially reversed.

Such reversal of the sequence of motion of the sticker support bracket 210 can result in removal of the sticker 14 from the sticker tray 27 and placement of the sticker back onto the sticker in-feed conveyor 16. The capability of the apparatus 100, 300 and 400 to remove one or more stickers 14 from the respective sticker trays 27 and replace the stickers on the in-feed conveyor 16 if further assisted by the fact that the sticker support bracket 210 remains substantially constantly directionally oriented throughout its range of motion, regardless of the direction of movement of either the sticker support bracket or the sticker 14 itself.

As can be appreciated, the capability of the apparatus 100, 300, and 400 to remove the sticker 14 from the respective sticker tray 27 is still further enhanced by the unique "double-horned" configuration of the sticker support bracket 210 which is explained in greater detail below. That is, the "double-horned" configuration of the sticker support bracket 210 enables the sticker support bracket to "capture" the sticker 14 from the sticker tray 27 during upward movement of the sticker support bracket and when the sticker is being removed from the sticker tray.

As is mentioned above, due to the unique configuration of the actuating assemblies 190, 390, and 490 as shown and discussed herein, the directional orientation of the sticker support bracket 210 with respect to the sticker tray 27 can remain substantially constant during movement of the sticker support bracket throughout its range of motion. In other words, the sticker support bracket 210 can remain, for example, in a substantially upwardly pointing orientation regardless of the position, movement, or location of the support bracket. This can be advantageous in facilitating control of the sticker 14 during movement thereof between the sticker in-feed conveyor 16 and the sticker tray 27, and vice versa.

Figure 6:
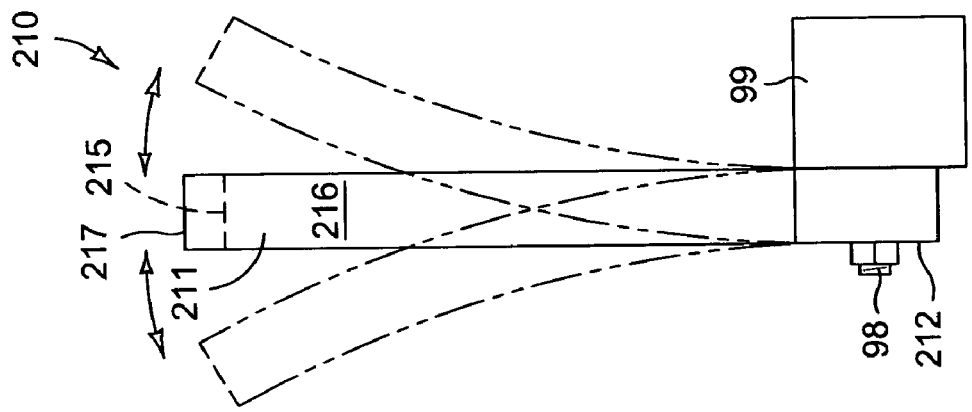
FIG. 6 is a side elevation view that depicts the sticker support bracket of FIG. 5.
Figure 5:
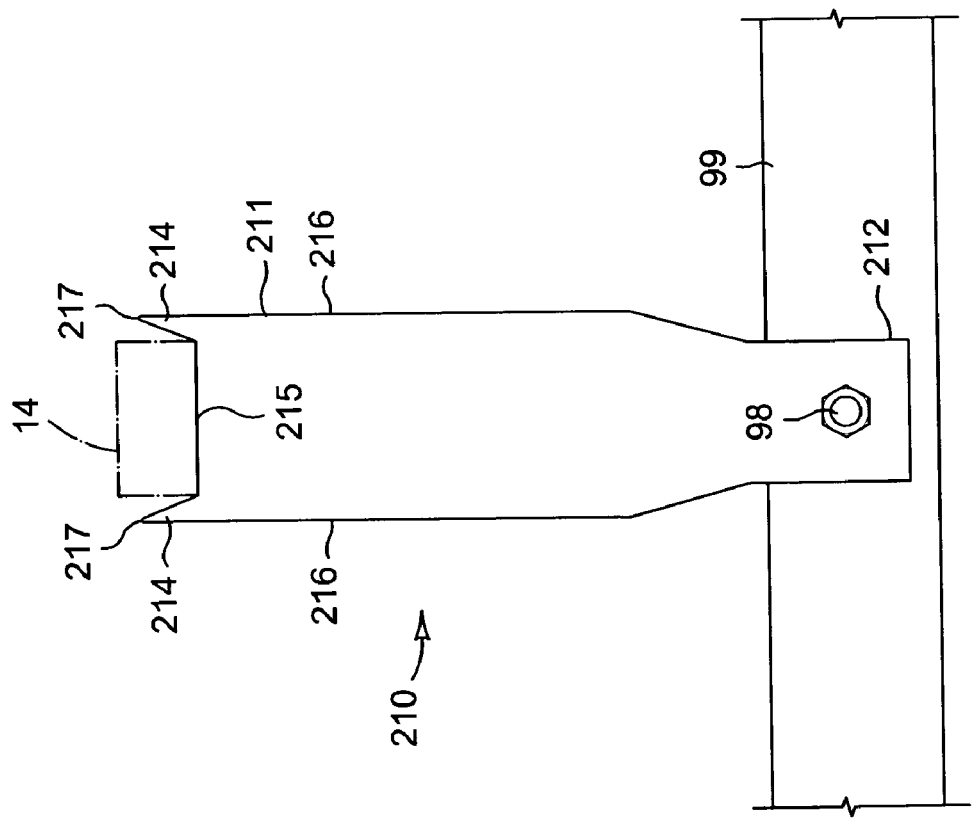
FIG. 5 is a front elevation detail view that depicts a sticker support bracket in accordance with one embodiment of the present invention.

Turning now to FIG. 5, a front detail view is shown in which the sticker support bracket 210 is depicted in accordance with one embodiment of the present invention. The sticker support bracket 210 can be substantially elongated, as shown, having a first end 211 and an opposite and distal second end 212. Mounting provisions can be provided on the second end 212 for mounting of the sticker support bracket 210 to a frame 99 or the like. For example, a hole (not shown) can be defined in the sticker support bracket 210 proximate the second end 212 for mounting by way of a threaded fastener 98 or the like. On the first end 211 of the sticker support bracket 210, a cradle area 213 can be defined between two substantially parallel, spaced horns 214. The cradle area 213 is configured to cradle and support therein at least a portion of a sticker 14. Each of the horns 214 extends longitudinally from the first end 211. The horns are configured to prevent the sticker 14 from falling off of the sticker support bracket 210 during movement thereof as described above with respect to the apparatus 100, 300, and 400. Also, still referring to FIG. 5, the horns 214 are separated from one another by a cradle surface 215 that is defined on the first end 211. The cradle surface 215 can be substantially flat. The cradle surface 215 can thus remain substantially level throughout the operation of the apparatus 100, 300, and 400 on which the sticker support bracket can be supported. The horns 214 can be substantially wedge-shaped, and can thus taper evenly to a respective extreme terminus 217. The horns 214 can also be substantially equal in length. Thus, the sticker support bracket 210 can be substantially symmetrical. The sticker support bracket 210 can also have two substantially parallel and opposite sides 216 defined thereon, wherein the cradle area is located substantially between the sides. Each of the sides 216 can be straight and substantially collinear with the respective terminus 217. That is, each side 216 can extend from a respective terminus 217, wherein, as extending therefrom, both sides 216 are substantially straight and parallel relative to one another. Turning now to FIG. 6, a side view is shown of the sticker support bracket 210 that is depicted in FIG. 5. As is indicated in FIG. 6, the sticker support bracket 210 can be resiliently deflectable. That is, the sticker support bracket 210 can be configured to resiliently deflect back and forth, as indicated by the phantom lines, from a normal position in which the sticker support bracket is biased, and which is indicated by the solid lines. In accordance with one configuration of the sticker support bracket 210 which is shown in FIGS. 5 and 6, the sticker support bracket can be fabricated from a resiliently flexible material.

Figure 8:
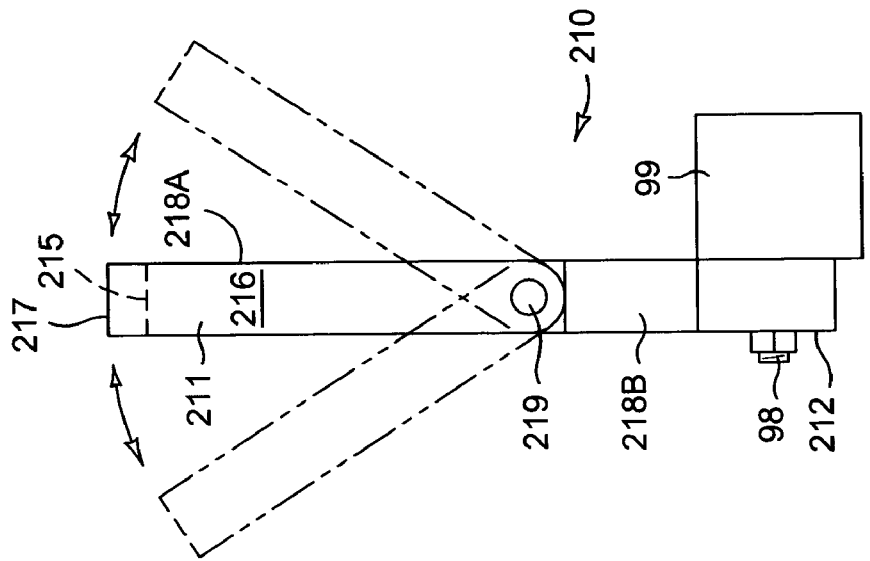
FIG. 8 is a side elevation view that depicts the sticker support bracket of FIG. 7.
Figure 7:
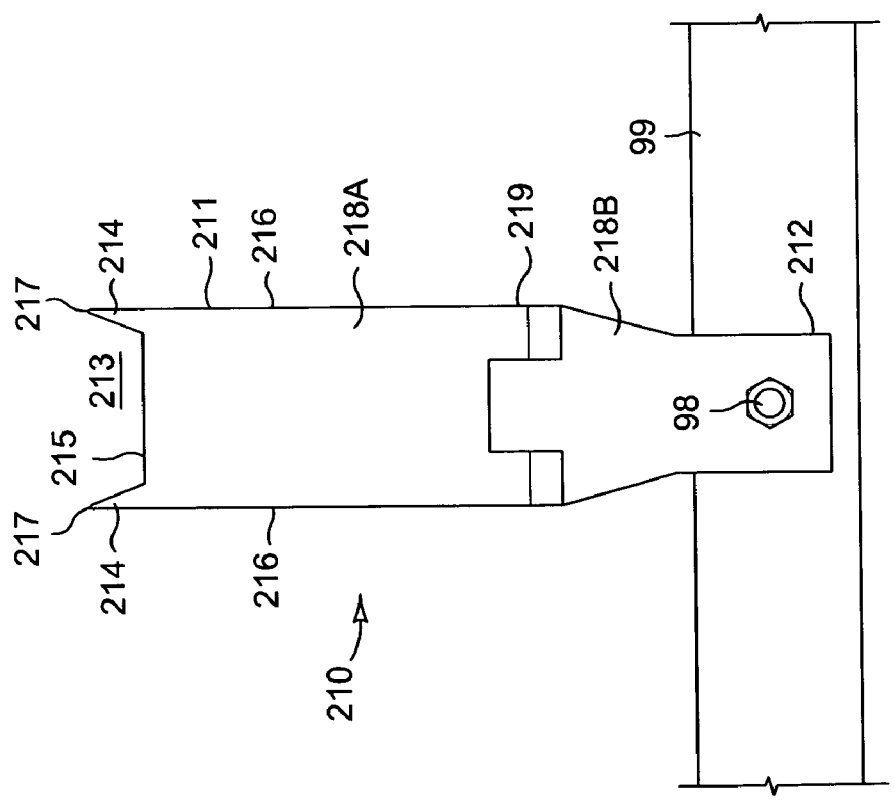
FIG. 7 is a front elevation detail view that depicts a sticker support bracket in accordance with another embodiment of the present invention.
Figure 9:
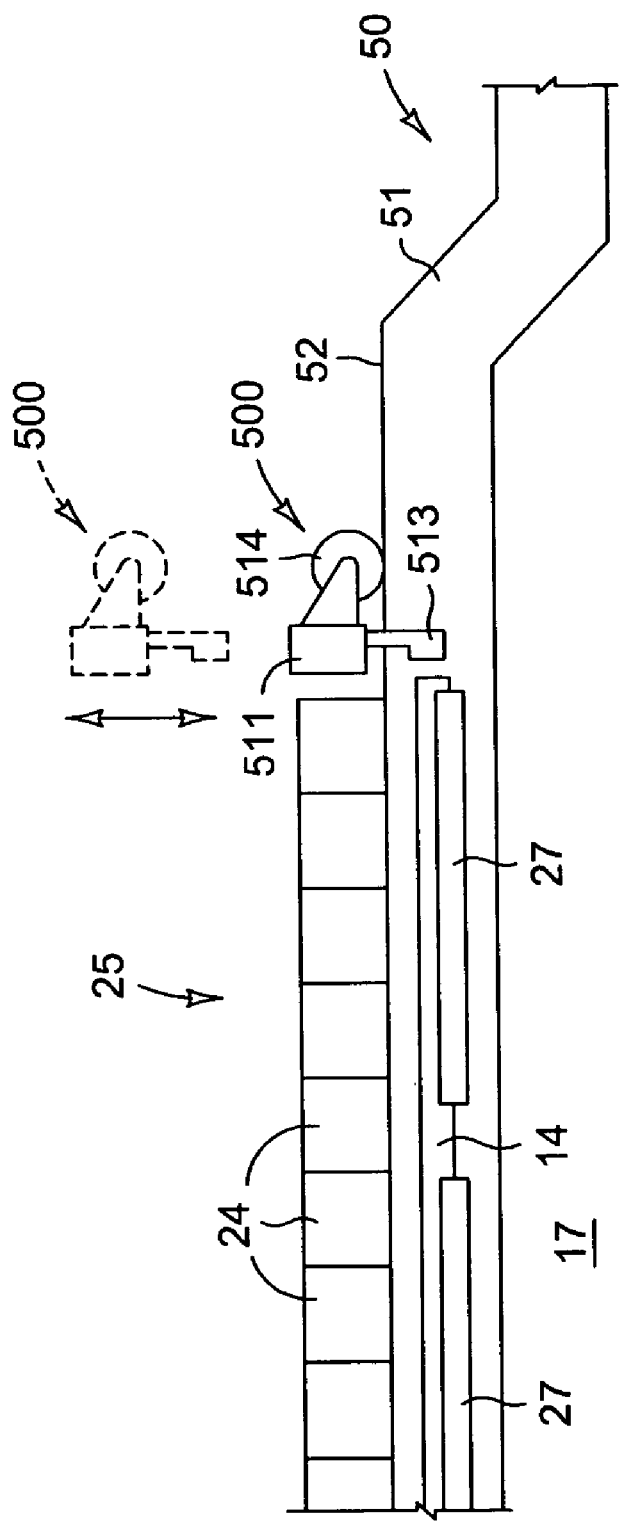
FIG. 9 is a side elevation view that depicts a rake off device in accordance with at least one embodiment of the present invention.

For example, the sticker support bracket 210 can be fabricated from a material comprising urethane. Such a resiliently flexible nature of the sticker support bracket 210 can prove advantageous in preventing permanent damage to the sticker support bracket, or other related components, in an event wherein an inadvertent collision occurs between the sticker support bracket and another object such as the sticker tray (not shown), or the like. Turning now to FIGS. 7 and 8, a front view and side view, respectively, are shown in which a sticker support bracket 210 having an alternative configuration is depicted. As is seen, the sticker support bracket 210 can include an upper portion 218A and a lower portion 218B. The first end 211 of the sticker support bracket 210 is defined on the upper portion 218A, while the second end 212 is defined on the lower portion 218B. The upper portion 218A and/or the lower portion 218B can be fabricated from a substantially rigid material. For example, the upper and lower portions 218A and 218B, respectively, can be fabricated from a metal, such as aluminum or steel. The sticker support bracket 210 can also include a resiliently flexible joint member 219 that is operatively connected between the upper portion 218A and the lower portion 218B, whereby the first end 211 is resiliently deflectable relative to the second end 212. That is, the joint member 219 can be resiliently flexible so as to allow the upper portion 218A to resiliently deflect back and forth, as indicated by the phantom lines, from a normal position in which the upper portion is biased, and which is indicated by the solid lines. The joint member 219 can be made resiliently flexible by the inclusion therein of a resiliently flexible member (not shown), such as a spring or the like. Alternatively, the joint member 219 can be fabricated from a resiliently flexible material, such as urethane or the like. Turning now to FIG. 9, an end view of the overhead rake-off device 500 of the present invention, having been briefly mentioned above with respect to FIG. 1, is shown at a stacking station 17, along with a side view of the fork assembly 50 which includes at least one fork arm 51, having supported thereon a lumber course 25 which includes a plurality of lumber pieces 24. As is also seen, a sticker 14 can be supported on the sticker tray 27. The rake-off device 500, as is seen from a study of FIG. 9, is configured to be lowered from a clear position 500' (in which the rake-off device is further indicated by phantom lines) to a lower strip position as shown in which the rake-off device is employed to strip the sticker 14 front the sticker tray 27 in conjunction with retraction of the fork assembly 50 from the stacking station 17.

The rake-off device 500 can include an elongated, horizontal rake-off bar 511 that can be operatively connected to a selectively controllable actuating mechanism (not shown) which is configured to move the rake-off device between the clear position 500, and the strip position in synchronization with the retraction of the fork assembly 50 from the stacking station. Such actuating mechanisms also provide stabilization and horizontal guidance of the rake-off device 500. It is understood that such actuating mechanisms that are typically employed to move rake-off devices between the clear position 500' and strip position are well known and need not be discussed or shown herein.

The rake-off device 500 can also include at least one stripping element 513 which is supported by the rake-off bar 511 and which is configured to contact a respective sticker 14 for stripping the sticker from the respective sticker tray 27 when the rake-off device 500 is in the strip (or lowered) position. The rake-off device 500 can further include at least one roller 514 that is operatively supported by the rake-off bar 511 and that is configured to contact, and roll upon, the upper surface 52 of the fork arm 51 when the rake-off device 500 is in the strip position. At least a portion of the weight of the rake-off device 500 can be borne by the roller 514 upon the upper surface 52 when the rake-off device is lowered into the strip position.

In operation, the fork assembly 50, while having supported thereon a lumber course 25, moves into the stacking station 17 and comes to rest temporarily. While the fork assembly 50 is at rest, the rake-off assembly 500 is synchronously lowered form the clear position 500' to the strip position, wherein the roller 514 operatively contacts the upper surface 52 of the respective fork arm 51. The fork assembly 50 is then retracted from the stacking station by movement thereof in the general direction from whence it entered the stacking station, while the rake-off device 500 remains substantially stationary at the stacking station and in the lowered strip position.

As the result of the retraction of the fork assembly 50 from the stacking station 17 while the rake-off device 500 is in the strip position, the stripping surface 513 contacts the respective sticker 14 and causes the sticker to be stripped from the associated sticker tray 27. It is understood that the lumber course 25 can also be stripped from the upper surface 52 of the fork arm 51 in a similar manner. However, it is also understood that the lumber course can, in the alternative, be stripped from the fork assembly 50 by other means which are not shown nor discussed herein.

It is seen from the above discussion in conjunction with an examination of FIG. 9 that the roller 514 of the present invention, while being caused to roll upon the upper surface 52 of the respective fork arm 51 to support at least a portion of the weight thereon of the rake-off device 500, can facilitate substantial vertical alignment and guidance of the stripping element 513 relative to the sticker tray 27 during retraction of the fork assembly from the stacking station 17.

While the above invention has been described in language more or less specific as to structural and methodical features, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A sticker handling apparatus for use in lumber stacking with a sticker in-feed conveyor and a fork arm defining an upper surface, with a sticker tray connected to the fork arm, the apparatus comprising:
   a sticker support bracket configured to support at least a portion of a sticker;
   an actuating assembly operatively connected to the sticker support bracket and comprising a first actuator configured to move the sticker support bracket in a first dimension, and a second actuator configured to move the sticker support bracket in a second dimension, wherein the first actuator and the second actuator are independently controllable; and
   an overhead rake-off device configured to be moved between a raised clear position and a lowered strip position, and further configured to strip the sticker from the sticker tray when in the lowered strip position and during retraction of the fork arm, the rake-off device comprising a roller operatively mounted thereon, wherein: the roller is configured to contact the upper surface of the fork arm and to roll thereon, thereby supporting at least a portion of the rake-off device, and thereby facilitating vertical alignment and guidance of the rake-off device while stripping the sticker from the sticker tray.

2. A sticker handling apparatus of for use in lumber stacking with a sticker in-feed conveyor and a fork arm with a sticker tray connected thereto, the apparatus comprising:
   a sticker support bracket configured to support at least a portion of a sticker;
   an actuating assembly operatively connected to the sticker support bracket and comprising a first actuator configured to move the sticker support bracket in a first dimension, and a second actuator configured to move the sticker support bracket in a second dimension, wherein the first actuator and the second actuator are independently controllable; and
   a substantially stationary base, wherein:
   the first actuator is operatively connected to the base and supported thereby;
   the first actuator, during operation thereof, remains substantially stationary relative to the base;
   the second actuator is operatively connected between the first actuator and the sticker support bracket;
   operation of the first actuator causes movement of the second actuator and the sticker support bracket relative to the base in the first dimension; and,
   operation of the second actuator causes movement of the sticker support bracket relative to the base in the second dimension.

3. A sticker handling apparatus for use in lumber stacking with a sticker in-feed conveyor and a fork arm with a sticker tray connected thereto, the apparatus comprising:
   a sticker support bracket configured to support at least a portion of a sticker;
   an actuating assembly operatively connected to the sticker support bracket and comprising a first actuator configured to move the sticker support bracket in a first dimension, and a second actuator configured to move the sticker support bracket in a second dimension, wherein;
   the first actuator and the second actuator are independently controllable; and
   selective actuation of at least one of the first actuator and the second actuator causes the sticker support bracket to lift the sticker from the sticker in-feed conveyor, and to place the sticker on the sticker tray.

4. The apparatus of claim 3, and wherein the sticker support bracket has a first end and an opposite distal second end, and wherein the sticker support bracket is substantially resiliently deflectable, whereby the first end is resiliently movable relative to the second end.

5. The apparatus of claim 4, and wherein the sticker support bracket is fabricated from a resiliently flexible material.

6. The apparatus of claim 5, and wherein the sticker support bracket is fabricated from a material comprising urethane.

7. The apparatus of claim 3, the sticker support bracket comprising:
   a substantially rigid upper portion configured to contact the sticker;
   a substantially rigid lower portion configured to be connected with the actuating assembly; and,
   a joint member which operatively connects the upper portion to the lower portion, wherein the joint member is resiliently flexible, whereby the upper portion is resiliently movable relative to the lower portion.

8. The apparatus of claim 3, and wherein the sticker support bracket has a first end and an opposite distal second end, and wherein a sticker cradle area is defined on the first end between two spaced and substantially parallel horns which longitudinally extend from the first end, and which are separated by a substantially flat sticker support surface.

9. The apparatus of claim 8, and wherein each of the horns is substantially wedge-shaped and is tapered substantially evenly toward respective extreme termini, thereby rendering horns substantially symmetrical to one another.

10. The apparatus of claim 3, and wherein further selective actuation of at least one of the first actuator or the second actuator causes the sticker support bracket to remove the sticker from the sticker tray.

11. The apparatus of claim 10, and wherein further selective actuation of at least one of the first actuator or the second actiuator causes the sticker support bracket to place the sticker back onto the sticker in-feed conveyor.

12. The apparatus of claim 11, and wherein further selective actuation of at least one of the first actuator or the second actuator causes the sticker support bracket to place the sticker on the sticker in-feed conveyor.

13. The apparatus of claim 3, and wherein during movement of the sticker support bracket by the actuating assembly:
   the sticker support bracket contacts the sticker;
   the sticker support bracket lifts the sticker from the sticker in-feed conveyor; and,
   there is no substantial angular movement of the sticker support bracket.

14. The apparatus of claim 3, and wherein during movement of the sticker support bracket by the actuating assembly:
   the sticker support bracket contacts the sticker;
   the sticker support bracket lifts the sticker from the sticker in-feed conveyor;
   the sticker is released from the sticker support bracket and thereby placed onto the sticker tray; and, there is no substantial angular movement of the sticker support bracket.

15. The apparatus of claim 3, and wherein during movement of the sticker support bracket by the actuating assembly:
the sticker support bracket contacts the sticker;
the sticker support bracket lifts the sticker from the sticker in-feed conveyor; and,
there is no substantial angular movement of the sticker.

16. The apparatus of claim 3, and wherein during movement of the sticker support bracket by the actuating assembly:
the sticker support bracket contacts the sticker;
the sticker support bracket lifts the sticker from the sticker in-feed conveyor;
the sticker is released from the sticker support bracket and thereby placed onto the sticker tray; and,
there is no substantial angular movement of the sticker tray.

17. The apparatus of claim 3, and wherein:
the first dimension is substantially linear; and,
the second dimension is substantially linear.

18. The apparatus of claim 3, wherein at least one of the first dimension or the second dimension is substantially nonlinear.

19. A sticker handling apparatus for use in lumber stacking with a sticker in-feed conveyor and a fork arm with a sticker tray connected thereto, the apparatus comprising:
a substantially stationary base;
a support member movably supported by the base
a carriage member movably supported by the support member and configured to move therewith relative to the base;
a sticker support bracket supported by the carriage member;
a first actuator configured to move the support member relative to the base member in a first dimension; and
a second actuator configured to move the carriage member relative to the support member in the second dimension, wherein the first actuator and a second actuator are independently controllable.

20. A sticker handling apparatus for use in lumber stacking with a sticker in-feed conveyor and a fork arm with a sticker tray connected thereto, the apparatus comprising:
a substantially stationary base;
a carriage member movably supported by the base
a support member movably supported by the carriage member and configured to move therewith relative to the base;
a sticker support bracket supported by the support member;
a first actuator configured to move the carriage member relative to the base member in a first dimension; and
a second actuator configured to move the support member relative to the carriage member in the second dimension, wherein the first actuator and a second actuator are independently controllable.

* * * * *